(12) United States Patent
Takahashi et al.

(10) Patent No.: US 12,107,939 B2
(45) Date of Patent: Oct. 1, 2024

(54) COORDINATION SYSTEM, COORDINATION METHOD, AND PROGRAM

(71) Applicant: NEC Corporation, Tokyo (JP)

(72) Inventors: Remina Takahashi, Tokyo (JP); Hiroshi Arai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/196,706

(22) Filed: May 12, 2023

(65) Prior Publication Data

US 2023/0379400 A1    Nov. 23, 2023

(30) Foreign Application Priority Data

May 17, 2022  (JP) .................................. 2022-080919

(51) Int. Cl.
| | | |
|---|---|---|
| *H04L 29/08* | (2006.01) | |
| *G06F 15/16* | (2006.01) | |
| *H04L 67/306* | (2022.01) | |
| *H04L 67/50* | (2022.01) | |
| *H04L 67/60* | (2022.01) | |

(52) U.S. Cl.
CPC ............ *H04L 67/60* (2022.05); *H04L 67/306* (2013.01); *H04L 67/535* (2022.05)

(58) Field of Classification Search
None
See application file for complete search history.

(56) References Cited

U.S. PATENT DOCUMENTS

| | | | |
|---|---|---|---|
| 2006/0233341 A1 | 10/2006 | Watanabe et al. | |
| 2008/0014931 A1* | 1/2008 | Yared | H04L 63/0815 |
| | | | 455/432.3 |
| 2009/0083367 A1* | 3/2009 | Li | G06Q 30/02 |
| | | | 709/202 |
| 2014/0006512 A1* | 1/2014 | Huang | G06Q 30/02 |
| | | | 709/204 |
| 2016/0330219 A1 | 11/2016 | Hasan | |

FOREIGN PATENT DOCUMENTS

| | | |
|---|---|---|
| JP | 2004-164313 A | 6/2004 |
| JP | 2006-268782 A | 10/2006 |
| JP | 2013-030124 A | 2/2013 |
| JP | 2018-521430 A | 8/2018 |
| JP | 2019-511030 A | 4/2019 |
| JP | 2019-175276 A | 10/2019 |

\* cited by examiner

*Primary Examiner* — Natisha D Cox

(57) ABSTRACT

To attain the object of providing a provider of a service with an environment in which service coordination allowing the provider to easily use user information in another service is carried out, included are: an identification unit that identifies a second service capable of providing user information to a provider of a first service; an inquiry unit that inquires, of a user who utilizes the first service, whether or not to consent to the provider of the first service using user information on the user in the second service at an opportunity of utilizing the first service; and a coordination unit that, in a case where information indicative of a consent of the user has been obtained, coordinates the first service and the second service by associating user information on the user in the first service and the user information on the user in the second service with each other.

9 Claims, 10 Drawing Sheets

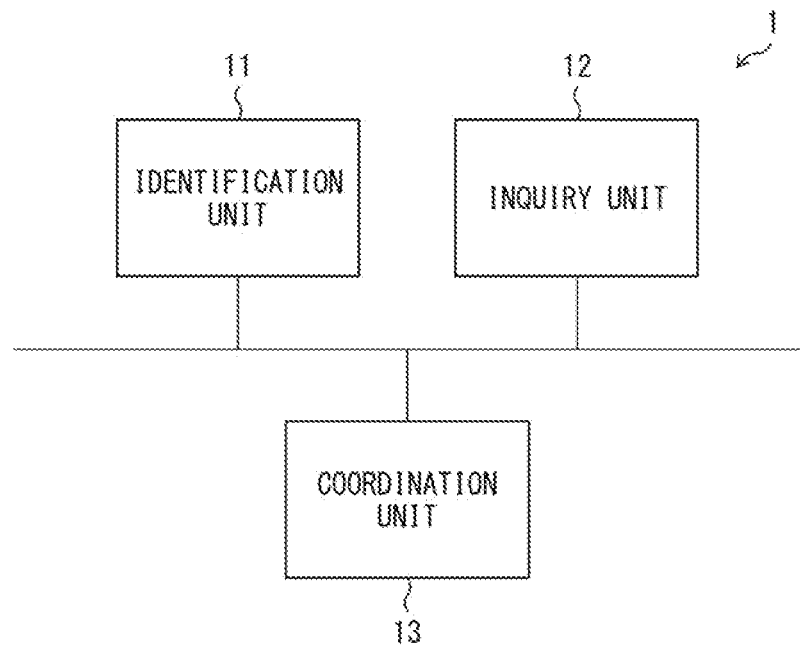
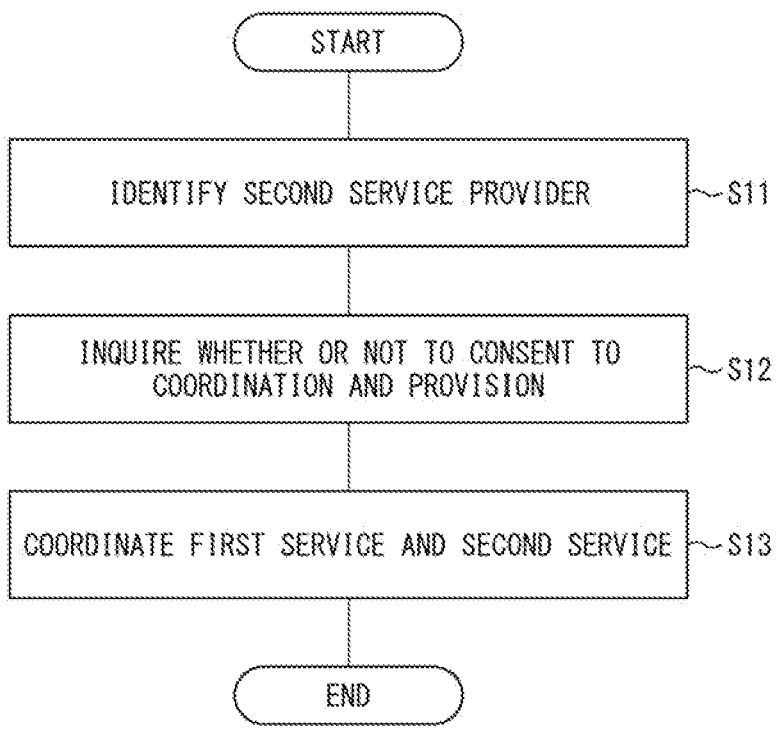

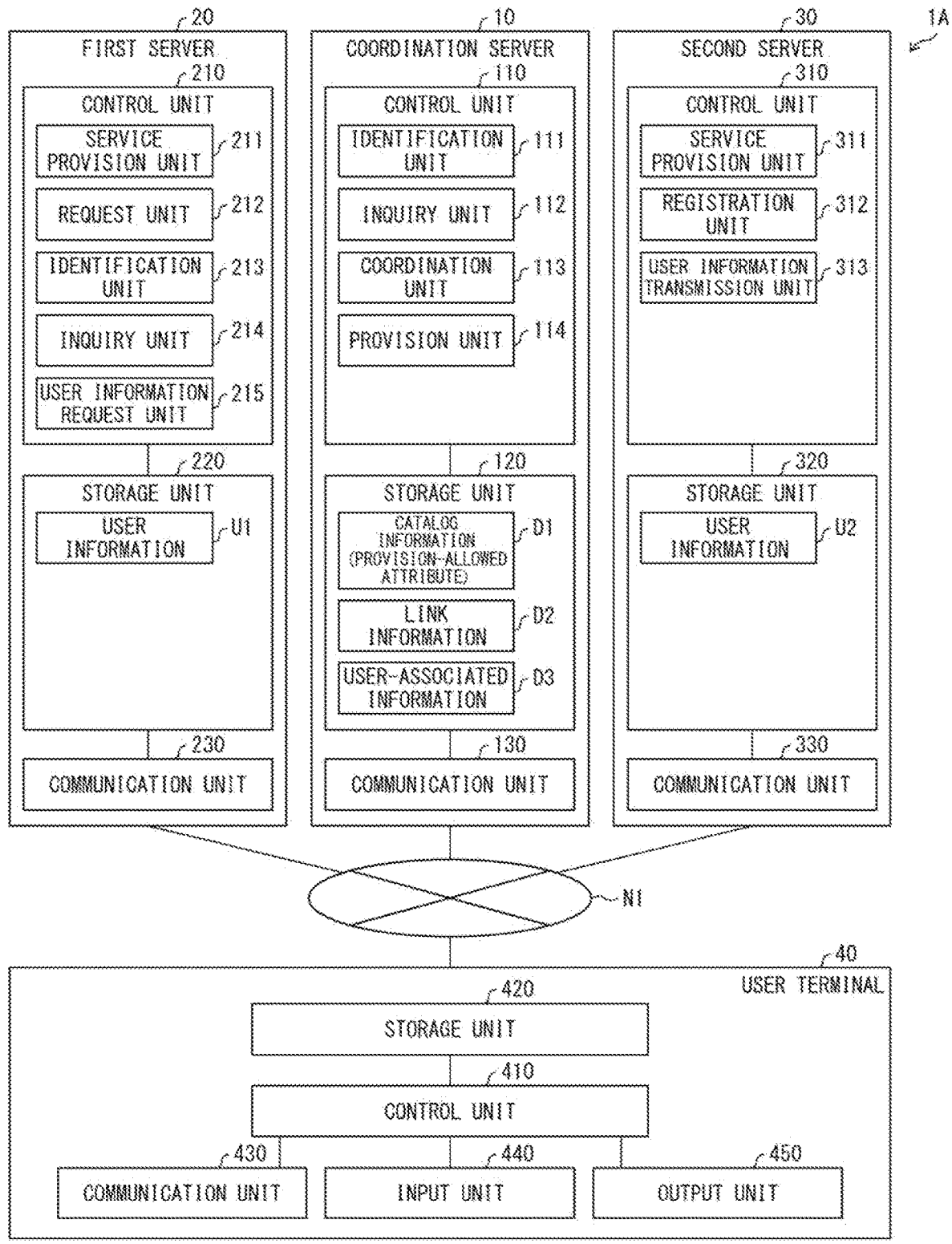

| USER ID OF SERVICE A | USER ID OF SERVICE B | VERSION OF CONSENT (B→A) |
|---|---|---|
| ID-A_001 | ID-B_001 | AGE AND FOOTSTEP COUNT |
| ID-A_002 | ID-B_002 | AGE |
| : | : | |

COORDINATION SYSTEM, COORDINATION METHOD, AND PROGRAM

This application is based upon and claims the benefit of priority from Japanese patent application No. Tokugan 2022-080919, filed on May 17, 2022, the disclosure of which is incorporated herein in its entirety by reference.

TECHNICAL FIELD

The present invention relates to a technique for coordinating a plurality of services.

BACKGROUND ART

Techniques for coordinating a plurality of services are known. For example, Patent Literature 1 describes a technique in which a request system and a provision system that participate in a system for coordinating a plurality of services provide data to a user. In this technique, when the request system is requested by the user for data and cannot provide the data, the data is acquired from another provision system and is provided to the user in a case where user authentication carried out by an authentication method which is determined according to the data has succeeded.

CITATION LIST

Patent Literature

[Patent Literature 1]
Japanese Patent Application Publication Tokukai No. 2013-30124

SUMMARY OF INVENTION

Technical Problem

Here, in the technique described in Patent Literature 1, user authentication is required each time a provider of the request system wants to use user information in the provision system regardless of whether or not a request from the user is made. This is unrealistic. Therefore, in the coordination system described in Patent Literature 1, it was difficult for the provider of the request system to use the user information in the provision system.

An example aspect of the present invention is attained in view of the above problem, and its example object is to provide a provider of a service with an environment in which service coordination that allows the provider of the service to easily use user information in another service is carried out.

Solution to Problem

A coordination system according to an example aspect of the present invention includes at least one processor, the at least one processor carrying out: an identification process of identifying a second service capable of providing user information to a provider of a first service; an inquiry process of inquiring, of a user who utilizes the first service, whether or not to consent to the provider of the first service using user information on the user in the second service at an opportunity of utilizing the first service; and a coordination process of, in a case where information indicative of a consent of the user has been obtained, coordinating the first service and the second service by associating user information on the user in the first service and the user information on the user in the second service with each other.

A coordination method according to an example aspect of the present invention includes: at least one processor identifying a second service capable of providing user information to a provider of a first service; the at least one processor inquiring, of a user who utilizes the first service, whether or not to consent to the provider of the first service using user information on the user in the second service at an opportunity of utilizing the first service; and the at least one processor, in a case where information indicative of a consent of the user has been obtained, coordinating the first service and the second service by associating user information on the user in the first service and the user information on the user in the second service with each other.

A non-transitory storage medium storing a program according to an example aspect of the present invention stores a program for causing a computer to carry out: an identification process of identifying a second service capable of providing user information to a provider of a first service; an inquiry process of inquiring, of a user who utilizes the first service, whether or not to consent to the provider of the first service using user information on the user in the second service at an opportunity of utilizing the first service; and a coordination process of, in a case where information indicative of a consent of the user has been obtained, coordinating the first service and the second service by associating user information on the user in the first service and the user information on the user in the second service with each other.

Advantageous Effects of Invention

An example aspect of the present invention makes it possible to provide a provider of a service with an environment in which service coordination that allows the provider of the service to easily use user information in another service is carried out.

BRIEF DESCRIPTION OF DRAWINGS

FIG. 1 is a block diagram illustrating a configuration of a coordination system according to a first example embodiment.

FIG. 2 is a flowchart illustrating the flow of a coordination method according to the first example embodiment.

FIG. 3 is a block diagram illustrating a configuration of a coordination system according to a second example embodiment.

EXAMPLE EMBODIMENTS

First Example Embodiment

Figure 4:
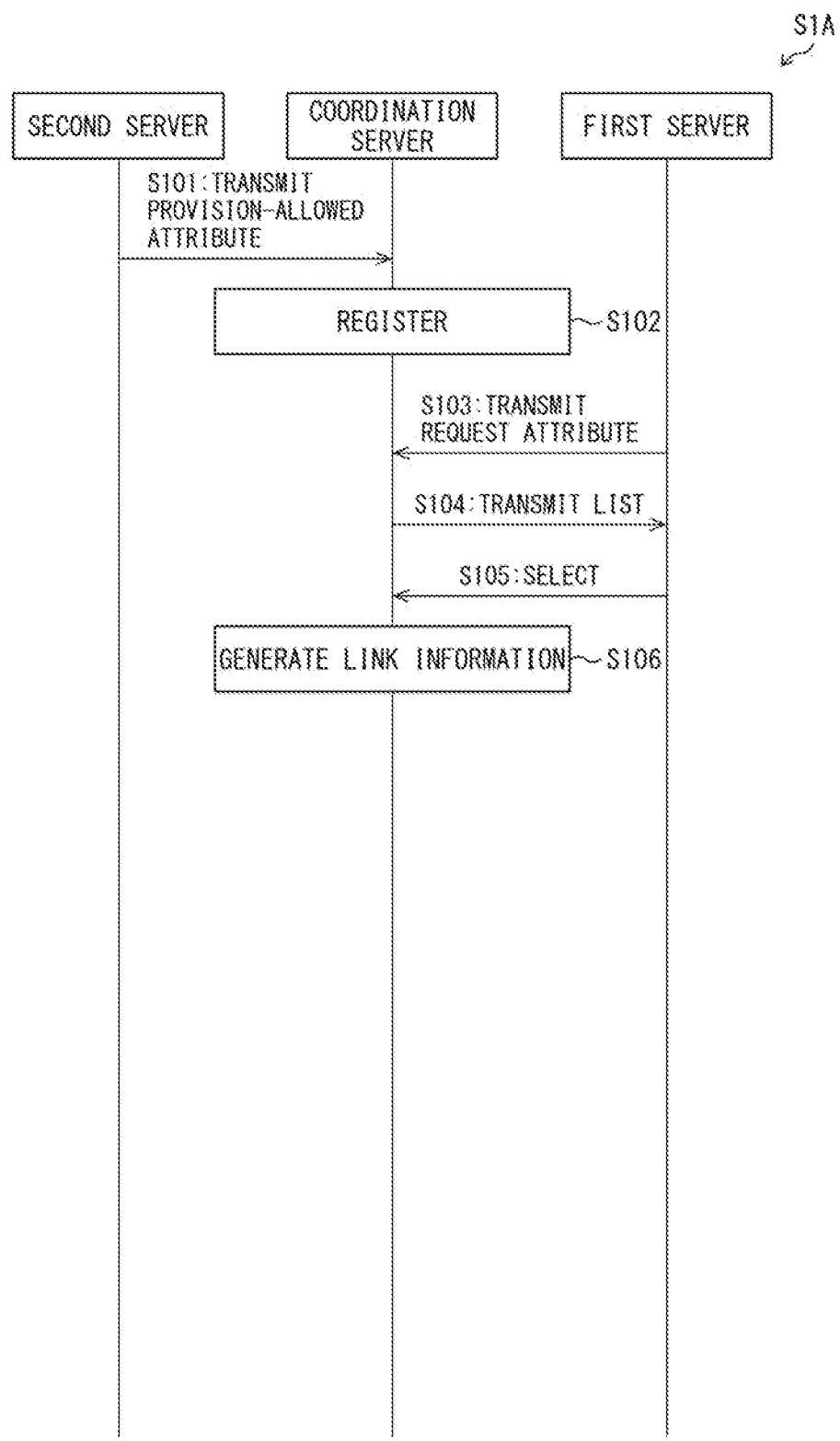
FIG. 4 is a flowchart illustrating the flow of a coordination method according to the second example embodiment.

The following description will discuss a first example embodiment of the present invention in detail with reference to the drawings. The present example embodiment is a basic form of an example embodiment described later.

<Configuration of Coordination System 1>

The following description will discuss a configuration of a coordination system 1 according to the present example embodiment with reference to FIG. 1. FIG. 1 is a block diagram illustrating the configuration of the coordination system 1.

As illustrated in FIG. 1, the coordination system 1 includes an identification unit 11, an inquiry unit 12, and a coordination unit 13. The identification unit 11 identifies a second service capable of providing user information to a provider of a first service. The inquiry unit 12 inquires, of a user who utilizes the first service, whether or not to consent to the provider of the first service using user information on the user in the second service at an opportunity of utilizing the first service. In a case where information indicative of a consent of the user has been obtained, the coordination unit 13 coordinates the first service and the second service by associating user information on the user in the first service and the user information on the user in the second service with each other.

<Flow of Coordination Method S1>

The coordination system 1 configured as described above carries out a coordination method S1 according to the present example embodiment. The following description will discuss the flow of the coordination method S1 with reference to FIG. 2. FIG. 2 is a flowchart illustrating the flow of the coordination method S1.

As illustrated in FIG. 2, the coordination method S1 includes steps S11 to S13. In step S11, the identification unit 11 identifies a second service capable of providing user information to a provider of a first service. In step S12, the inquiry unit 12 inquires, of a user who utilizes the first service, whether or not to consent to the provider of the first service using user information on the user in the second service at the opportunity of utilizing the first service. In step S13, in a case where information indicative of a consent of the user has been obtained, the coordination unit 13 coordinates the first service and the second service by associating user information on the user in the first service and the user information on the user in the second service with each other.

<Program Implementation Example>

In a case where the coordination system 1 is configured by a computer, the following program is stored in a memory which is referred to by the computer. The program causes the computer to function as the identification unit 11 that identifies a second service capable of providing user information to a provider of a first service, the inquiry unit 12 that inquires, of a user who utilizes the first service, whether or not to consent to the provider of the first service using the user information on the user in the second service at the opportunity of utilizing the first service, and the coordination unit 13 that, in a case where information indicative of a consent of the user has been obtained, coordinates the first service and the second service by associating the user information on the user in the first service and the user information on the user in the second service with each other.

The above-described coordination method S1 is realized when the computer reads the program from the memory and executes the program.

Effect of the Present Example Embodiment

As described above, the present example embodiment employs a configuration of: identifying a second service capable of providing user information to a provider of a first service; inquiring, of a user who utilizes the first service, whether or not to consent to the provider of the first service using the user information on the user in the second service at the opportunity of utilizing the first service; and, in a case where information indicative of a consent of the user has been obtained, coordinating the first service and the second service by associating the user information on the user in the first service and the user information on the user in the second service with each other.

According to the above-described configuration, the first service and the second service are coordinated after the consent of the user to the provider of the first service using the user information in the second service has been obtained. As a result, it is possible to provide the provider of the first service with an environment in which service coordination that allows the provider of the first service to easily use the user information in the second service is carried out.

Second Example Embodiment

The following description will discuss a second example embodiment of the present invention in detail with reference to the drawings. The same reference numerals are given to constituent elements which have functions identical with those described in the first example embodiment, and descriptions as to such constituent elements are omitted as appropriate.

<Configuration of Coordination System 1A>

The following description will discuss a configuration of a coordination system 1A according to the present example embodiment with reference to FIG. 3. FIG. 3 is a block diagram illustrating the configuration of the coordination system 1A. As illustrated in FIG. 3, the coordination system 1A includes a coordination server 10, a first server 20, a second server 30, and a user terminal 40. These apparatuses are communicably connected to each other via a network N1. The network N1 may include, for example, but not limited to, wired local area network (LAN), wireless LAN, wide area network (WAN), mobile data communication, Internet, and the like. Although FIG. 3 illustrates each apparatus as a single apparatus, the number of each apparatus may be two or more.

The coordination server 10 is a server that provides a coordination service. Here, the coordination service is a service of coordinating a plurality of services. Each of the plurality of services is provided by a corresponding one of service providers. Note that one service provider may provide a plurality of services or may provide one service.

Among a plurality of service providers, a service provider who requests user information in another service is referred to as a first service provider. In addition, among a plurality of services, a service provided by the first service provider is referred to as a first service. The first service can be a target for coordination by the coordination service. The first server 20 is a server that provides the first service and has a function of requesting and acquiring user information in a second service.

Further, among the plurality of services, a service capable of providing user information to the first service provider is referred to as a second service. In addition, among the plurality of service providers, a service provider who provides the second service is referred to as a second service provider. The second service can be a target for coordination by the coordination service. The second server is a server that provides the second service and has a function of providing user information to the first service provider.

The user terminal 40 is a terminal used by the user. The user who uses the user terminal 40 utilizes both the first service and the second service. For example, the user may be a user who has completed both user registration in the first service and user registration in the second service.

Note that each service provider can be the first service provider and the second service provider. That is, each service can be the first service and the second service. In other words, the first server 20 may further include a functional block of the second server 30. In addition, the second server 30 may further include a functional block of the first server 20. In some cases, the first service provider and the second service provider are simply referred to as a service provider when it is not necessary to particularly distinguish between the first service provider and the second service provider. In some cases, the first service and the second service are simply referred to as a service when it is not necessary to particularly distinguish between the first service and the second service.

(Configuration of Coordination Server 10)

The coordination server 10 includes a control unit 110, a storage unit 120, and a communication unit 130. The control unit 110 collectively controls each unit of the coordination server 10. The storage unit 120 stores various data to be referred to by the control unit 110. The communication unit 130 transmits and receives information to and from other apparatus via the network N1.

In addition, the control unit 110 includes an identification unit 111, an inquiry unit 112, a coordination unit 113, and a provision unit 114. The identification unit 111 and an identification unit 213 of the first server 20, which will be described later, can be an example of a configuration in which an identification means recited in the claims is dispersedly disposed in the coordination server 10 and the first server 20. The inquiry unit 112 and an inquiry unit 214 of the first server 20, which will be described later, can be an example of a configuration in which an inquiry means recited in the claims is dispersedly disposed in the coordination server 10 and the first server 20. The coordination unit 113 can be an example of a configuration for realizing a coordination means recited in the claims. The provision unit 114 can be an example of a configuration for realizing a provision means recited in the claims. The storage unit 120 stores catalog information D1, link information D2, and user-associated information D3. Details of these units and data will be discussed in "Flows of coordination methods S1A to S1C", which will be described later.

(Configuration of First Server 20)

The first server 20 includes a control unit 210, a storage unit 220, and a communication unit 230. The control unit 210 collectively controls each unit of the first server 20. The storage unit 220 stores various data to be referred to by the control unit 210. The communication unit 230 transmits and receives information to and from other apparatus via the network N1.

In addition, the control unit 210 includes a service provision unit 211, a request unit 212, an identification unit 213, an inquiry unit 214, and a user information request unit 215. The storage unit 220 stores user information U1.

The user information U1 is information on a user who utilizes the first service. The user information U1 includes, for example, authentication information (as an example, a user ID and a password) of the user in the first service and attributes of the user. The service provision unit 211 carries out a process of providing the first service to the user. In addition, the service provision unit 211 carries out generation, update, and the like of the user information U1. Further, the service provision unit 211 carries out a process of performing authentication of the user with reference to the authentication information included in the user information U1. Details of other units and data in the first server 20 will be discussed in "Flows of coordination methods S1A to S1C", which will be described later.

(Configuration of Second Server 30)

The second server 30 includes a control unit 310, a storage unit 320, and a communication unit 330. The control unit 310 collectively controls each unit of the second server 30. The storage unit 320 stores various data to be referred to by the control unit 310. The communication unit 330 transmits and receives information to and from other apparatus via the network N1.

In addition, the control unit 310 includes a service provision unit 311, a registration unit 312, and a user information transmission unit 313. The storage unit 320 stores user information U2.

The user information U2 is information on a user who utilizes the second service. The user information U2 includes, for example, authentication information (as an example, a user ID and a password) in the second service and attributes of the user. The service provision unit 311 carries out a process of providing the second service to the user. In addition, the service provision unit 311 carries out generation, update, and the like of the user information U2. Further, the service provision unit 311 carries out a process of performing authentication of the user with reference to the authentication information included in the user information U2. Details of other units and data in the second server 30 will be discussed in "Flows of coordination methods S1A to S1C", which will be described later. Details of these units and data will be discussed later.

(Configuration of User Terminal 40)

The user terminal 40 includes a control unit 410, a storage unit 420, a communication unit 430, an input unit 440, and an output unit 450. The control unit 410 collectively controls each unit of the user terminal 40. The storage unit 420 stores various data to be referred to by the control unit 410. The communication unit 430 transmits and receives information to and from other apparatus via the network N1. The input unit 440 accepts an input operation of the user to the user terminal 40. The input unit 440 may be, for example, a keyboard, a mouse, a touch pad, or a combination thereof. The output unit 450 outputs information under the control of the control unit 410. The output 450 may be, for example, a display, a speaker, or a combination thereof. The input unit 440 and the output unit 450 may be, for example, a touch panel or the like into which the input unit 440 and the output unit 450 are integrally formed.

<Flow of Coordination Method S1A>

The coordination system 1A configured as described above carries out coordination methods S1A to S1C according to the present example embodiment.

First, the coordination method S1A will be described with reference to FIG. 4. FIG. 4 is a flowchart illustrating the flow of the coordination method S1A. The coordination method S1A is a method for identifying a second service capable of providing the user information U2 to the first service provider. As illustrated in FIG. 4, the coordination method S1A includes steps S101 to S106. In steps S101 to S105 until the second service is identified in step S106, the service provided by the second server 30 is also referred to as "candidate for the second service".

In step S101, the registration unit 312 of the second server 30 transmits, to the coordination server 10, registration information for registering a provision-allowed attribute. The registration information includes identification information of a candidate for the second service and the provision-allowed attribute. The provision-allowed attribute is an attribute of the user information U2 that is allowed to be provided to the provider of the first service in the candidate for the second service. The provision-allowed attribute may be part or all of the attributes included in the user information U2.

Figure 5:
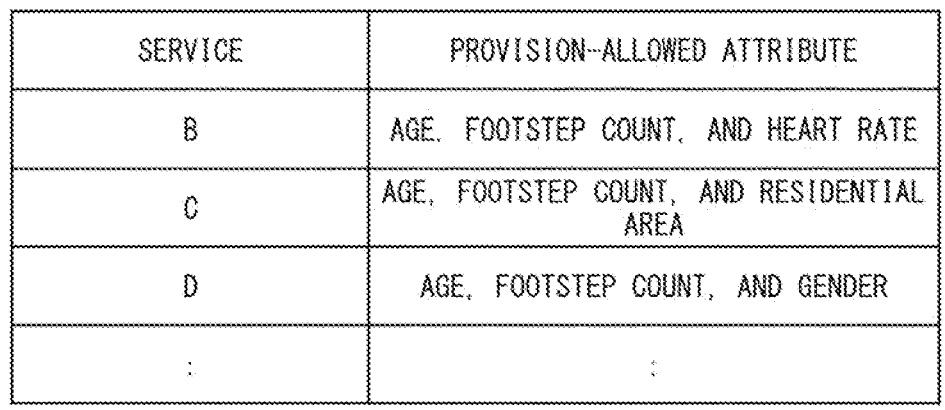
FIG. 5 is a view for describing a specific example of catalog information in the second example embodiment.

In step S102, the identification unit 111 of the coordination server 10 registers the provision-allowed attribute in the catalog information D1 with reference to the received registration information. The catalog information D1 is information that includes respective provision-allowed attribute(s) of one or more candidates for the second service. A specific example of the catalog information D1 will be described with reference to FIG. 5. FIG. 5 is a view for describing a specific example of the catalog information D1. As illustrated in FIG. 5, an example of the catalog information D1 includes information in which identification information of a service (candidate for the second service) and the provision-allowed attribute are associated with each other. Hereinafter, a service which is given "X" as the identification information is also referred to as Service X. For example, in this example, the provision-allowed attribute of Service B is an age, a footstep count, and a heart rate. Further, the provision-allowed attribute of Service C is an age, a footstep count, and a residential area. Further, the provision-allowed attribute of Service D is an age, a footstep count, and a gender.

In step S103, the request unit 212 of the first server transmits, to the coordination server 10, request information for requesting the user information U2. For example, the request information includes identification information of the first service and a request attribute. The request attribute is an attribute of the user information U2 requested by the first service provider. Here, it is assumed that the request information including an age and a footstep count as the request attribute has been transmitted.

In step S104, the identification unit 111 of the coordination server 10 extracts candidates for the second service that are associated with the provision-allowed attribute including the request attribute, with reference to the catalog information D1. Further, the identification unit 111 transmits, to the first server 20, a list of the extracted candidates (hereinafter, candidate list). For example, in the catalog information D1 illustrated in FIG. 5, all of the provision-allowed attributes of Services B, C, and D include an age and a footstep count which are the request attribute. Then, "B, C, and D" are transmitted in the form of the candidate list.

In step S105, the request unit 212 of the first server selects some or all of the candidates in the candidate list. The request unit 212 transmits the selected candidate(s) to the coordination server 10. For example, the request unit 212 may output the candidate list to an output apparatus (not illustrated) and select some or all of the candidates in accordance with an input operation of the first service provider with respect to an input apparatus (not illustrated).

In step S106, the identification unit 111 of the coordination server 10 identifies the second service with reference to the catalog information D1 (provision-allowed attribute) and the request attribute. Specifically, the identification unit 111 of the coordination server 10 identifies the candidate(s) received in step S105 as the second service. In addition, the identification unit 111 generates link information D2 in which the first service and the identified second service are linked to each other and stores the link information D2 in the storage unit 120. Further, when the identification unit 111 has generated the link information D2, the identification unit 111 may notify the first server 20 of completion of linking with the second service.

Figure 6:
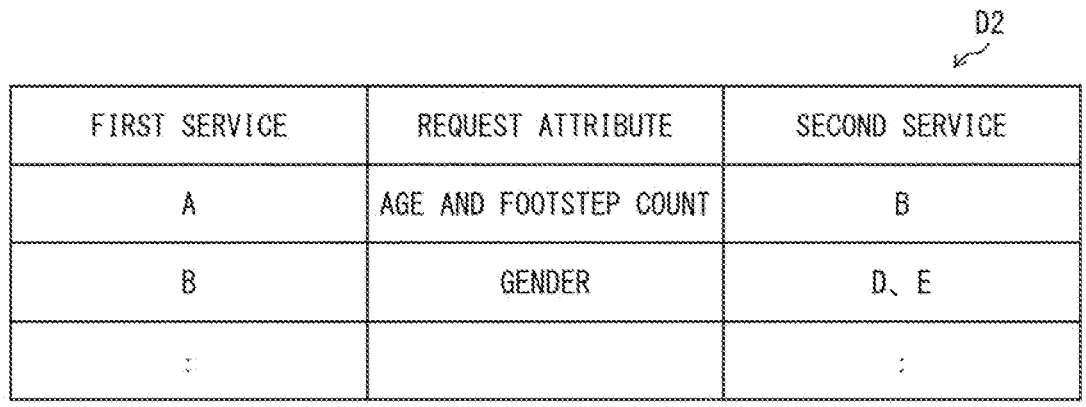
FIG. 6 is a view for describing a specific example of link information in the second example embodiment.

A specific example of the link information D2 will be described with reference to FIG. 6. FIG. 6 is a view for describing a specific example of the link information D2. As illustrated in FIG. 6, an example of the link information D2 is information in which the identification information of the first service, the request attribute, and identification information of the second service are associated with each other. Specifically, the identification unit 111 generates the link information D2 by associating the identification information of the first service and the request attribute, which are included in the request information received in step S103, and the identification information of the second service identified in step S106 with each other. For example, in the example of FIG. 6, Service B, as the second service capable of providing the user information U2 of the request attribute "age and footstep count", is associated with Service A (first service). In addition, Services D and E, as the second service capable of providing the user information U2 of the request attribute "gender", are associated with Service B (first service).

For example, the provider of Service A (first service provider) may access a site of the catalog information D1 published by the coordination server 10, refer to the catalog information D1, and then input the request attribute. Then, the provider of Service A may select Service B from among the extracted candidates "B, C, and D" in the candidate list. Accordingly, Service B is identified as the second service, and the first row of the link information D2 in FIG. 6 is generated. In other words, the first row of the link information D2 indicates that it is possible to coordinate Service A and Service B.

This is the end of the description of the coordination method S1A.

<Flow of Coordination Method S1B>

Figure 7:
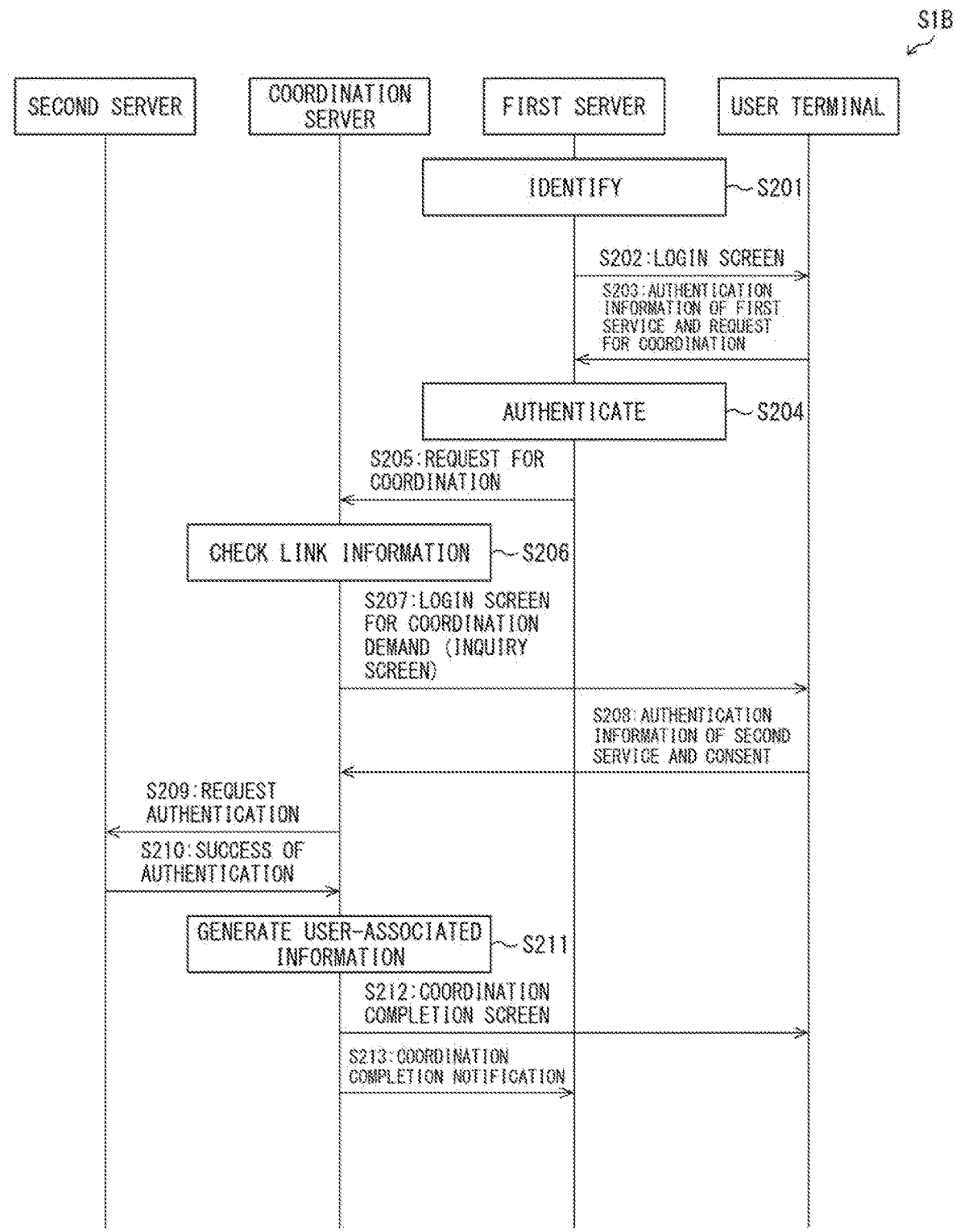
FIG. 7 is a flowchart illustrating the flow of the coordination method that follows on from FIG. 4.

Next, the coordination method S1B will be described with reference to FIG. 7. FIG. 7 is a flowchart illustrating the flow of the coordination method S1B. The coordination method S1B is carried out with reference to the link information D2 generated in the coordination method S1A. In the coordination method S1B, it is inquired whether or not the user consents to the provision of the user information U2 in the second service to the first service provider in connection with the coordination between the first service and the second service. In addition, in a case where the consent has been obtained, the first service and the second service are coordinated. As illustrated in FIG. 7, the coordination method S1B includes steps S201 to S213.

In step S201, the identification unit 213 of the first server 20 identifies the second service capable of providing the user information U2 to the first service provider, with reference to the link information D2. For example, this step may be carried out upon receiving access to the first service from the user terminal 40. The access to the first service may be, for example, access to a web page for utilizing the first service.

For example, the identification unit 213 may identify the second service linked to the first service by inquiring of the coordination server 10 that possesses the link information D2. Alternatively, in a case where a notification of the completion of linking has been provided from the coordination server 10 in step S106, the identification unit 213 may identify the second service indicated by the notification of the completion of linking, without contacting the coordination server 10.

Note that, in a case where a plurality of second services are linked to the first service in the link information D2, the identification unit 213 may identify, as the second service, some of the plurality of second services or may identify, as the second service, all of the plurality of second services. In a case where the identification unit 213 has identified a plurality of second services, the coordination system 1A may carry out subsequent processes for each second service.

In step S202, the inquiry unit 214 transmits, to the user terminal 40, a login screen (an example of a first inquiry screen) for performing user authentication in the first service. In addition, the inquiry unit 214 includes, in the login screen, information indicative of an inquiry about whether or not to request coordination between the first service and the second service. The control unit 410 of the user terminal 40 displays the received login screen on the output unit 450 (in this case, a display).

Figure 8:
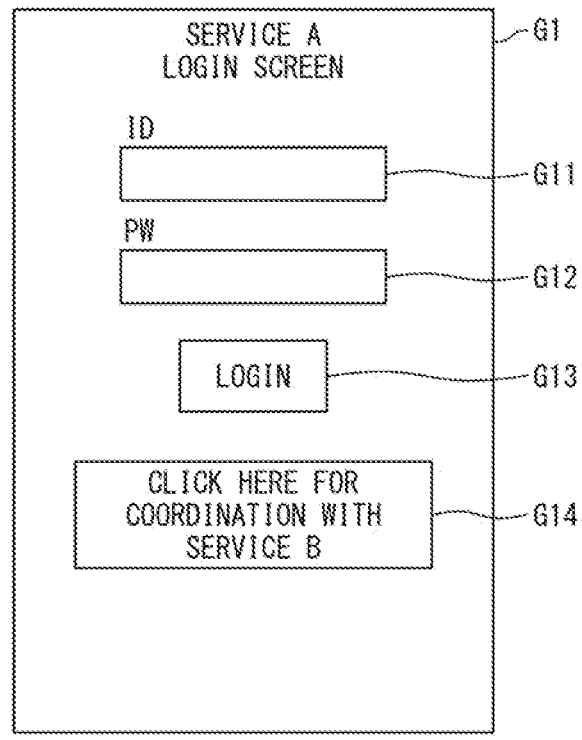
FIG. 8 is a view illustrating an example of a login screen in the second example embodiment.

A specific example 1 of the login screen will be described with reference to FIG. 8. FIG. 8 is a view illustrating an example of the login screen. In this example, the first service is named "Service A", and the second service is named "Service B". A login screen G1 illustrated in FIG. 8 is displayed on the user terminal 40 in response to access to "Service A" from the user terminal 40. The login screen G1 includes user interface (UI) objects G11 to G14. The UI objects G11 and G12 accept input of authentication information (in this example, a user ID and a password) of Service A. The UI object G13 accepts an operation of utilizing Service A without coordination with Service B. The UI object G14 accepts a request for coordination with Service B. That is, the operation performed on the UI object G13 indicates that a request for coordination between Service A and Service B is not made. Further, an operation performed on the UI object G14 indicates that the request for coordination between Service A and Service B is made.

Figure 9:
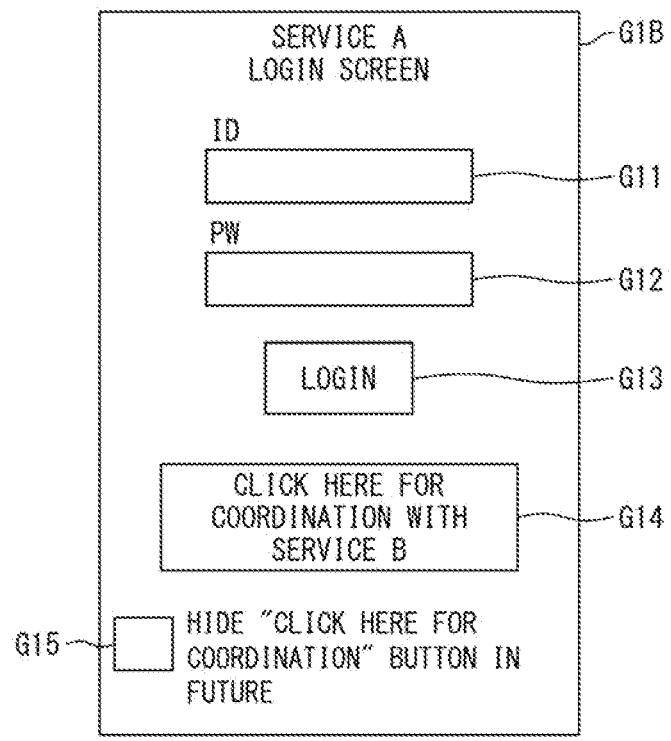
FIG. 9 is a view illustrating another example of the login screen in the second example embodiment.

In addition, a specific example 2 of the login screen will be described with reference to FIG. 9. FIG. 9 is a view illustrating another example of the login screen. The login screen G1B illustrated in FIG. 9 includes an UI object G15, in addition to the UI objects G11 to G14 as in the login screen G1. An operation performed on the UI object G15 indicates an instruction of a user that any inquiry about the coordination request is not necessary from then on. When the operation performed on the UI object G15 is accepted, the inquiry unit 214 does not include, in the login screen of Service A, the inquiry about the request for coordination with Service B from then on.

Figure 10:
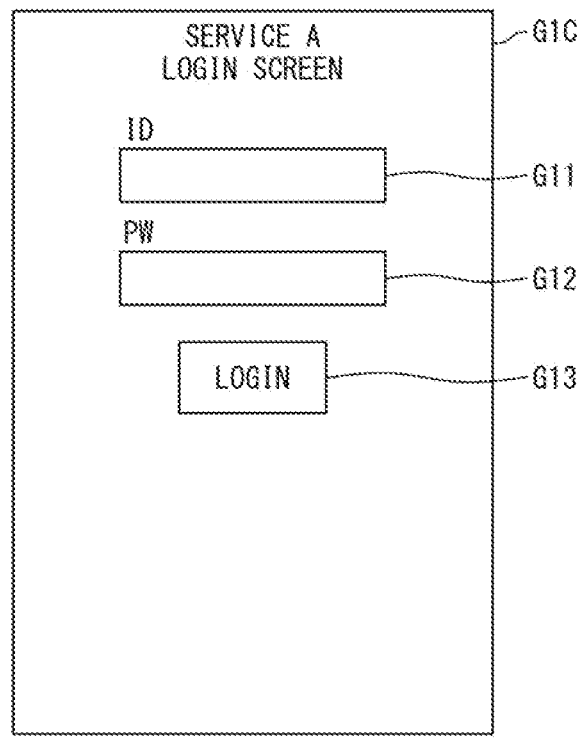
FIG. 10 is view illustrating an example of a login screen that does not include an inquiry about a request for coordination in the second example embodiment.

A specific example of a login screen that is displayed when such an operation performed on the UI object G15 (operation indicating that the inquiry about the request for coordination is not necessary) has been accepted will be described with reference to FIG. 10. FIG. 10 is view illustrating an example of a login screen that does not include the inquiry about the request for coordination. A screen G1C illustrated in FIG. 10 does not include the UI object G14 for performing a request for coordination among the UI objects G11 to G14 as in the login screen G1. This saves a user who utilizes Service A but does not utilize Service B or a user who has selected not to consent to the coordination with Service B the hassle of receiving an inquiry about the request for coordination each time the user accesses Service A. Note that the login screen G1 is also displayed in response to access of the user who has already coordinated Service A and Service B.

In step S203, the control unit 410 of the user terminal transmits, to the first server 20, the authentication information of the first service and the request for coordination between the first service and the second service. For example, assume that the operation performed on the UI object G14 (operation to request the coordination) has been accepted in the login screen G1 illustrated in FIG. 8 or the login screen G1B illustrated in FIG. 9. In this case, the control unit 410 transmits, to the first server 20, the authentication information (a user ID and a password) that has been inputted to the UI object G11 or G12 and the request for the coordination. Then, the process from step S204 is carried out. In other words, in a case where a result of the inquiry in the login screen G1 or G1B (first inquiry screen) indicates the request for the coordination, the process from step S204 is carried out.

Note that, in a case where the operation performed on the UI object G13 (operation not to request the coordination) has been accepted, the coordination method S1B ends, and a process of providing the first service is carried out by the service provision unit 211.

In step S204, the service provision unit 211 of the first server 20 carries out a process of performing user authentication in the first service with reference to the user information U1 and the authentication information that has been received in step S203. In a case where the authentication has succeeded, then the process from step S205 is carried out. In a case where the authentication has not succeeded, the coordination method S1B ends.

In step S205, the inquiry unit 214 of the first server transmits, to the coordination server 10, a request for coordination between the first service and the second service. The request for the coordination includes the user information U1 of the user in the first service.

In step S206, the inquiry unit 112 of the coordination server 10 makes an inquiry to the user via a login screen for coordination demand, on the evidence of the link information D2 possessed by the coordination server 10. Specifically, the inquiry unit 112 checks the link information D2 to ascertain whether or not it is possible to coordinate the first service and the second service. In a case where it is not possible to coordinate the first service and the second service, the coordination method S1B ends. In a case where it is possible to coordinate the first service and the second service, the inquiry unit 112 makes the inquiry via the login screen for coordination demand in step S207, which will be described below. That is, the inquiry unit 112 makes an inquiry to the user with reference to the link information D2.

In step S207, the inquiry unit 112 of the coordination server 10 transmits, to the user terminal 40, the login screen for coordination demand (an example of a second inquiry screen) for performing user authentication in the second service. In addition, the inquiry unit 112 includes, in the login screen for coordination demand, information indicative of an inquiry about whether or not to consent to the first service provider using the user information U2 on the user in the second service. The control unit 410 of the user terminal 40 displays the received login screen for coordination demand on the output unit 450 (in this case, a display).

Figure 11:
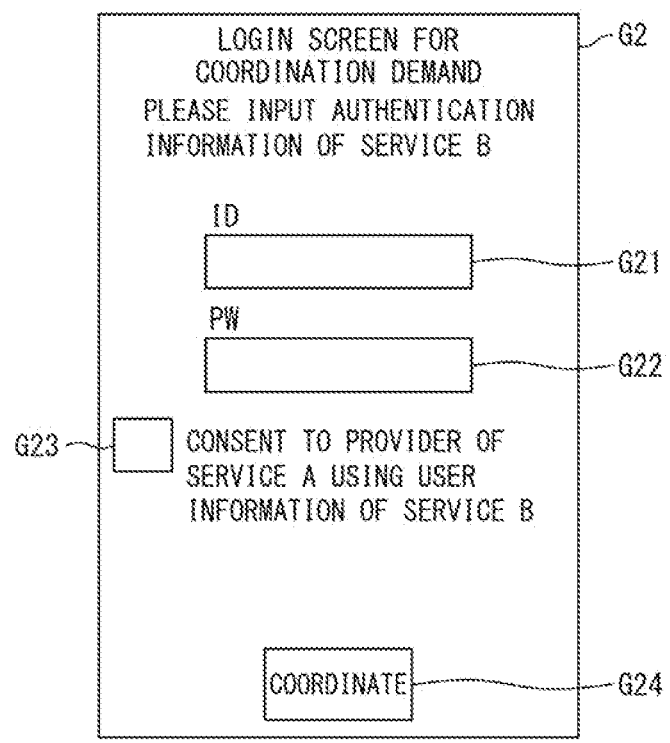
FIG. 11 is a view illustrating an example of a login screen for coordination demand in the second example embodiment.

A specific example 1 of the login screen for coordination demand will be described with reference to FIG. 11. FIG. 11 is a view illustrating an example of the login screen for coordination demand. A login screen G2 for coordination demand illustrated in FIG. 11 includes UI objects G21 to G24. The UI objects G21 and G22 accept input of authentication information (in this example, a user ID and a password) of Service B. An operation performed on the UI object G23 indicates a consent to the provider of Service A (first service provider) using the user information U2 of Service B. The UI object G24 accepts an operation of consenting to the coordination between Service A and Service B.

In addition, the inquiry unit 112 of the coordination server 10 may further inquire bounds of what is permitted to be used by the first service provider among the user information U2 on the user in the second service. Hereinafter, such "bounds of what is permitted to be provided" is also referred to as "version of consent".

Figures 12, 13:
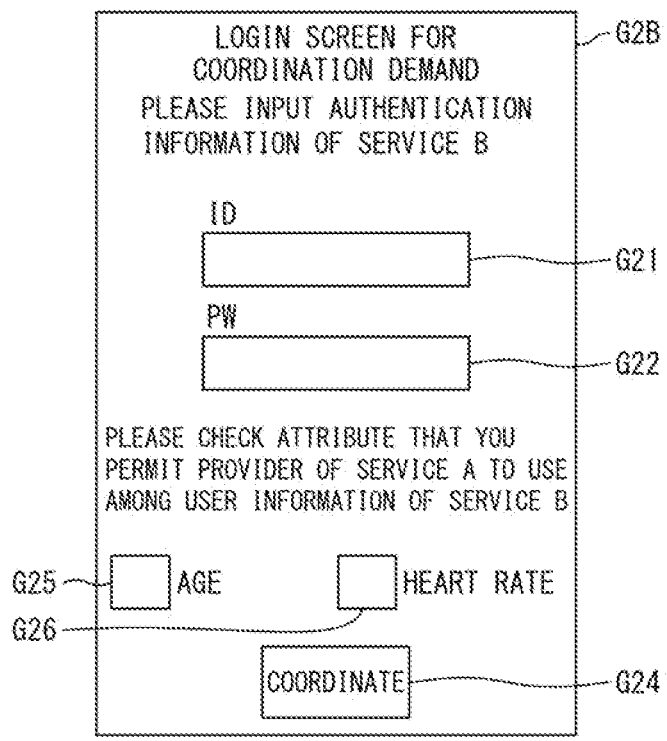
FIG. 12 is a view illustrating another example of a login screen for coordination demand in the second example embodiment.
FIG. 13 is a view for describing a specific example of user-associated information in the second example embodiment.

For example, a specific example 2 of the login screen for coordination demand including an inquiry about the version of consent will be described with reference to FIG. 12. FIG. 12 is a view illustrating another example of the login screen for coordination demand. A login screen G2B for coordination demand illustrated in FIG. 12 includes UI objects G25 and G26 in place of the UI object G23 among the UI objects G21 to G24 as in the login screen G2 for coordination demand. An operation performed on the UI object G25 indicates a consent to the provider of Service A using information on the age among the user information U2 of Service B. In addition, an operation performed on the UI object G26 indicates a consent to the provider of Service A using information on the heart rate among the user information U2 of Service B. That is, operations performed on the UI objects G25 and G26 allow the user to specify the version of consent.

In this manner, by carrying out steps S202 to S207, the inquiry unit 214 and the inquiry unit 112 inquire, of the user who utilizes the first service and the second service, whether or not to consent to "the provider of the first service using the user information U2 on the user in the second service in connection with the coordination between the first service and the second service".

In step S208, the control unit 410 of the user terminal transmits, to the coordination server 10, the authentication information of the second service and information indicative of the consent to the coordination between the first service and the second service. For example, assume that the operation performed on the UI object G24 (operation to consent to the coordination) has been accepted in the login screen G2 for coordination demand illustrated in FIG. 11 or the login screen G2B for coordination demand illustrated in FIG. 12. In this case, the control unit 410 transmits, to the coordination server 10, the authentication information (a user ID and a password) that has been inputted to the UI objects G21 and G22 and information indicative of the consent.

In step S209, the coordination unit 113 of the coordination server 10 requests a process of performing authentication in the second service by transmitting, to the second server 30, the authentication information that has been received in step S208.

In step S210, the service provision unit 311 of the second server 30 carries out a process of performing user authentication in the second service with reference to the user information U2 and the authentication information that has been received in step S209. In a case where the authentication has succeeded, then the process from step S210 is carried out. In a case where the authentication has not succeeded, the coordination method S1B ends.

In step S210, the service provision unit 311 of the second server 30 transmits, to the coordination server 10, information indicating that the authentication has succeeded.

In step S211, the coordination unit 113 of the coordination server 10 associates the user information U1 on the user in the first service and the user information U2 on the user in the second service with each other. That is, in a case where the coordination unit 113 has obtained information indicative of a consent of the user to "the provider of the first service using the user information U2 on the user in the second service in connection with the coordination between the first service and the second service" through steps S208 to S211, the coordination unit 113 performs authentication of the user with use of the authentication information in the second service. Then, in a case where the authentication has succeeded, the coordination unit 113 coordinates the first service and the second service by associating the user information U1 on the user in the first service and the user information U2 on the user in the second service with each other.

For example, the coordination unit 113 generates user-associated information D3 in which the user information U1 on the user in the first service and the user information U2 on the user in the second service are associated with each other, and stores the user-associated information D3 in the storage unit 120. A specific example of the user-associated information D3 will be described with reference to FIG. 13. FIG. 13 is a view for describing a specific example of the user-associated information D3. As illustrated in FIG. 13, the user-associated information D3 includes information in which a user ID of Service A (first service), a user ID of Service B (second service), and a version of consent are associated with each other. For example, the user ID of Service A is included in the coordination request that the coordination server 10 has received in step S205. In addition, the user ID of Service B and the version of consent are included in the information that the coordination server has received in step S208. Note that, in a case where the user information U2 does not exist, the user information U2 may be newly generated.

For example, in this example, a user who utilizes Service A (first service) with use of a user ID "ID-A_001" utilizes Service B (second service) with use of a user ID "ID-B_001". In addition, a consent of the user to the service provider of Service A using information on age and information on footstep count among the user information U2 managed in Service B for the user has been obtained. That is, the version of consent is "age and footstep count".

In addition, in this example, a user who utilizes Service A (first service) with use of a user ID "ID-A_002" utilizes Service B (second service) with use of a user ID "ID-B_002". In addition, a consent of the user to the service provider of Service A using information on age among the user information U2 managed in Service B for the user has been obtained. That is, the version of consent is "age".

In step S212, the coordination unit 113 of the coordination server 10 transmits, to the user terminal 40, information indicative of the completion of the coordination (coordination completion screen). The control unit 410 of the user terminal 40 outputs the received information to the output unit 450. This allows the user to recognize that coordination between the first service and the second service has been completed and that the first service provider uses the user information U2 in the second service.

In step S213, the coordination unit 113 of the coordination server 10 transmits, to the first server 20, information indicative of the completion of the coordination (coordination completion notification). The control unit 210 of the first server 20 outputs the received information to an output apparatus (not illustrated). This allows the first service provider to recognize that coordination between the first service and the second service has been completed and that the content of the user to the use of the user information U2 in the second service has already been obtained.

From then on, the coordination system 1A can refer to the user-associated information D3 and provide, to the user, the first service and the second service in a coordinated manner. For example, when authentication in the first service has succeeded, the user can utilize the second service without the need to perform authentication in the second service. In addition, when authentication in the second service has succeeded, the user can utilize the first service without the need to perform authentication in the first service. The user-associated information D3 may further include an integrated ID. The integrated ID may be an integrated ID newly generated in step S211 or may be an existing integrated ID already possessed by the user. In this case, when authentication of the integrated ID has succeeded, the user can utilize the first service and the second service without the need to perform authentication in the first service and the second service.

This is the end of the description of the coordination method S1B.

<Flow of Coordination Method S1C>

Figure 14:
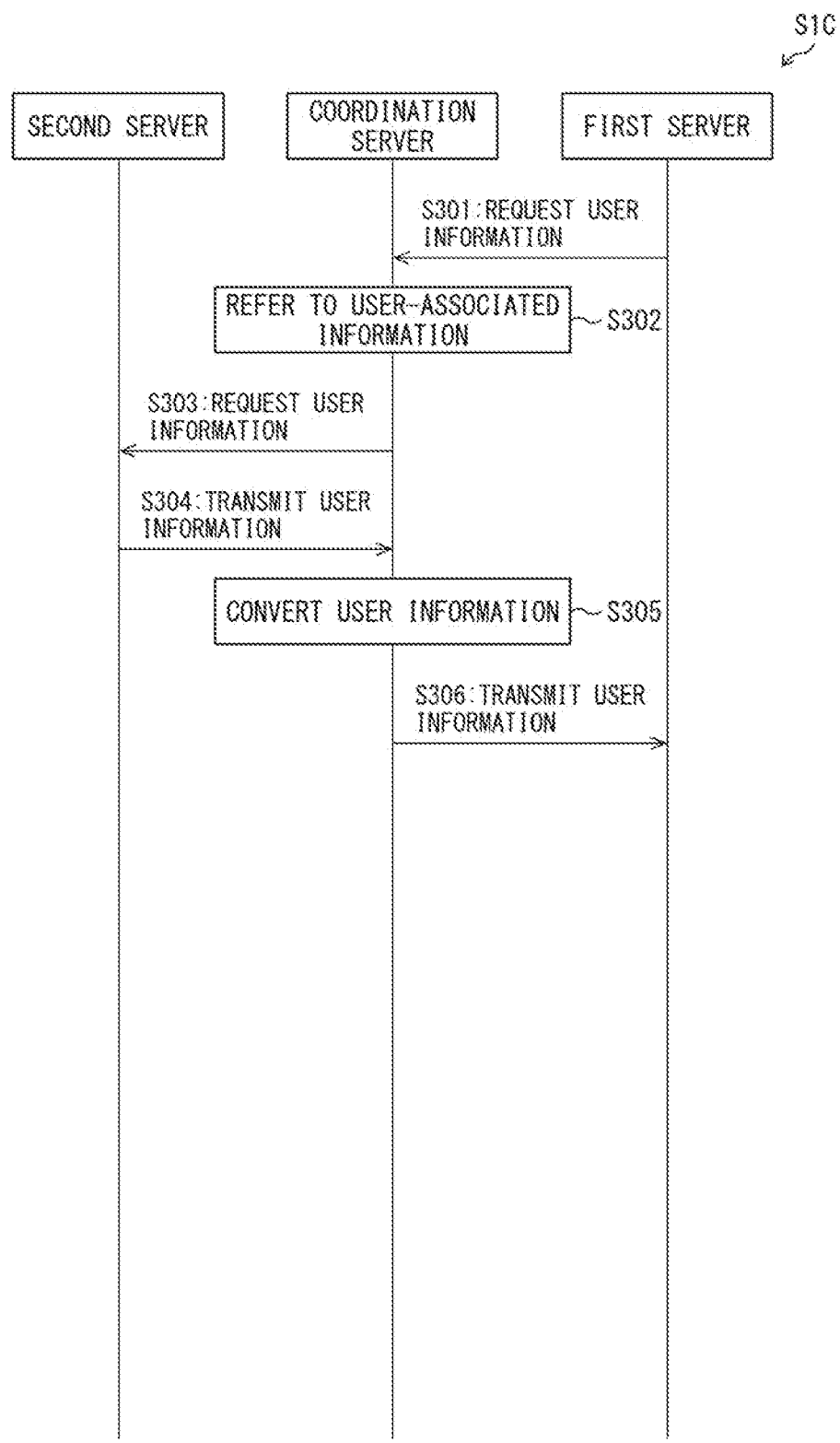
FIG. 14 is a flowchart illustrating the flow of the coordination method that follows on from FIG. 7.

Next, the coordination method S1C will be described with reference to FIG. 14. FIG. 14 is a flowchart illustrating the flow of the coordination method S1C. The coordination method S1C is carried out with reference to the user-associated information D3 generated in the coordination method S1B. In the coordination method S1C, the user information U2 in the second service is provided to the first service provider. The first server 20 does not need to make an inquiry to the user about a consent in the coordination method S1C since the consent of the user to the use of the user information U2 in the second service has already been obtained in the coordination method S1B. As illustrated in FIG. 14, the coordination method S1C includes steps S301 to S306.

In step S301, the user information request unit 215 of the first server 20 requests, of the coordination server 10, the user information U2 in the second service on the user in the first service. For example, the user information request unit 215 transmits, to the coordination server 10, request information that includes the identification information of the first service and the user ID of the user who utilizes the first service.

In step S302, the provision unit 114 of the coordination server 10 identifies the user of the second service corresponding to the user of the first service, with reference to the user ID of the first service included in the request information and the user-associated information D3. In addition, in a case where the version of consent has been set, the provision unit 114 acquires the version of consent set for the user of the first service with reference to the user-associated information D3.

For example, in a case where the request information includes the user ID "ID-A_001" of Service A, the provision unit 114 identifies the user ID "ID-B_001" of Service B with reference to the user-associated information D3 illustrated in FIG. 8. In addition, the provision unit 114 acquires "age and footstep count" as the version of consent.

In step S303, the provision unit 114 requests, of the second server 30, the user information U2 on the identified user in the second service. For example, the provision unit 114 transmits, to the second server 30, request information that includes the identified user ID of the second service and the version of consent.

In step S304, the user information transmission unit 313 of the second server 30 transmits, to the cooperation server 10, the requested user information U2 on the user in the second service. For example, in a case where the version of consent has been set, the user information transmission unit 313 transmits, to the coordination server 10, an attribute(s) indicated by the version of consent among the user information U2.

In step S305, the provision unit 114 of the coordination server 10 converts the received user information U2 in the second service into the user information U1 in the first service, with reference to the user-associated information D3. A process of performing the conversion may include, for example, a process of converting a format of the user information U2 in the second service into a format of the user information U1 in the first service. Further, information for performing such a conversion may be included in the user-associated information D3.

In step S306, the provision unit 114 transmits, to the first server 20, the user information U1 that has been obtained by the conversion. Thus, the provision unit 114 provides, to the provider of the first service, the user information U2 in the second service which is associated with the user information U1 in the first service.

This is the end of the description of the coordination method S1C.

Effect of the Present Example Embodiment

As described above, the present example embodiment employs a configuration of identifying the second service with reference to the provision-allowed attributes in the candidates for the second service and the request attribute(s) requested by the provider of the first service.

This enables the first service provider to more reliably acquire, from the second service, an attribute of the user information U2 the use of which the first service provider requests (request attribute) and then use the acquired attribute of the user information U2.

In addition, the present example embodiment employs a configuration of generating the link information D2 in which the first service and the second service are linked to each other, and making an inquiry to the user with reference to the link information D2.

Thus, with reference to the link information D2, it is possible to carry out the coordination between the first service and the second service with higher reliability.

In addition, the present example embodiment employs a configuration of providing, to the first service provider, the user information U2 in the second service which is associated with the user information U1 in the first service.

Thus, since the consent of the user has been obtained when the first service and the second service have been coordinated, the first service provider can easily use the user information U2 on the user in the second service without making an inquiry of any further consent.

In addition, the present example embodiment employs a configuration of causing "information indicative of an inquiry about whether or not to request coordination between the first service and the second service" to be included in the login screen for performing user authentication in the first service (first inquiry screen). Further, the present example embodiment employs a configuration of, in a case where a result of an inquiry in the login screen indicates a request for the coordination, including, in the login screen for coordination demand for performing user authentication in the second service (second inquiry screen), "information indicative of an inquiry about whether or not to consent to the provider of the first service using the user information U2 on the user in the second service".

This makes it possible to guide the user who has accessed the first service to more easily consent to the coordination with the second service and to the provision of the user information U2.

In addition, the present example embodiment employs a configuration of further making an inquiry of the version of consent among the user information U2 on the user in the second service.

This makes it easier to obtain a consent to the use of the user information U2 from the user who requests the coordination between the first service and the second service.

Variation 1

The present example embodiment is also applicable to a case where one or both of the first service and the second service is/are an integrated service(s) into which a plurality of services are integrated. For example, the first service may manage a first integrated ID into which user IDs of services under management are integrated. In addition, the second service may manage a second integrated ID into which user IDs of services under management are integrated. In this case, the inquiry unit 112 and the inquiry unit 214 make an inquiry to a user who has the first integrated ID and the second integrated ID. Details of the inquiry include "an inquiry about whether or not to consent to a provider of each service under management of the first service using the user information U2 in each service under the management of the second service in connection with the coordination between the first service and the second service". Even in a case modified in this manner, the present example embodiment produces the same effect as described above.

Variation 2

In the present example embodiment, when the user accesses the first service, the identification unit 111 and the identification unit 213 may identify, in real time, the second service capable of providing the user information U2 to the provider of the first service. Specifically, for example, in place of or in addition to generating the link information D2 in advance, the identification unit 111 and the identification unit 213 may generate the link information D2 in real time when the user accesses the first service. In this case, the coordination system 1A carries out steps S104 to S106 in the coordination method S1A in step S201 in the coordination method S1B. Thus, the second service is identified with reference to the latest catalog information D1.

Variation 3

In the present example embodiment, the inquiry unit 214 may cause information indicative of an inquiry about whether or not to request the coordination between the first service and the second service to be included, only for a predetermined time period, in a login screen that is to be displayed in a case where access to the first service has been accepted. For example, in a case where access to the first service has been accepted within a predetermined time period, a login screen illustrated in FIG. 8 is displayed on the user terminal 40. Further, in time periods other than the predetermined time period, the login screen illustrated in FIG. 10 is displayed. This saves a user the hassle of receiving an inquiry about the request for coordination each time the user accesses Service A, as in the case of FIG. 9.

Variation 4

The present example embodiment may be modified so as to operate, for a user who utilizes the first service but does not utilize the second service, in the following manner. For example, the coordination system 1A may guide such a user to carry out user registration of the second service, so that the inquiry unit 112 and the inquiry unit 214 make an inquiry in a case where the user registration of the second service has been completed. For example, the coordination system 1A may display a user registration screen of the second service in a case where the operation performed on the UI object G14 has been accepted in the login screen G1 illustrated in FIG. 8 or the login screen G1B illustrated in FIG. 9. In addition, in this case, in a case where the user registration has been completed by the operation performed on the user registration screen, the coordination system 1A may display the login screen for coordination demand illustrated in FIG. 11 or 12. This produces the effect of promoting the coordination between the first service and the second service, for a user who has not utilized the second service yet, with the consent of the user to the first service provider using the user information U2.

Other Variations

In the present example embodiment, the process of performing authentication of the user in the first service is not limited to being carried out by the first server 20, and may be carried out by another authentication server. In addition, the user information U1 in the first server 20 is not limited to being stored in the first server 20, and may be stored in another server. Similarly, the process of performing authentication of the user in the second service is not limited to being carried out by the second server 30, and may be carried out by another authentication server. In addition, the user information U2 in the second server 30 is not limited to being stored in the second server 30, and may be stored in another server.

In addition, in the present example embodiment, the authentication information of the user may include other authentication information in place of or in addition to the ID and password. For example, the authentication information of the user may include biometric authentication information.

In the present example embodiment, the functional blocks and the data included in the coordination system 1A are not limited to being disposed in the manner illustrated in FIG. 3, and may be disposed in any one of the following apparatuses: the coordination server 10; the first server 20; and the second server 30.

Software Implementation Example

The functions of part of or all of the apparatuses constituting the coordination systems 1 and 1A can be realized by hardware such as an integrated circuit (IC chip) or can be alternatively realized by software.

Figure 15:
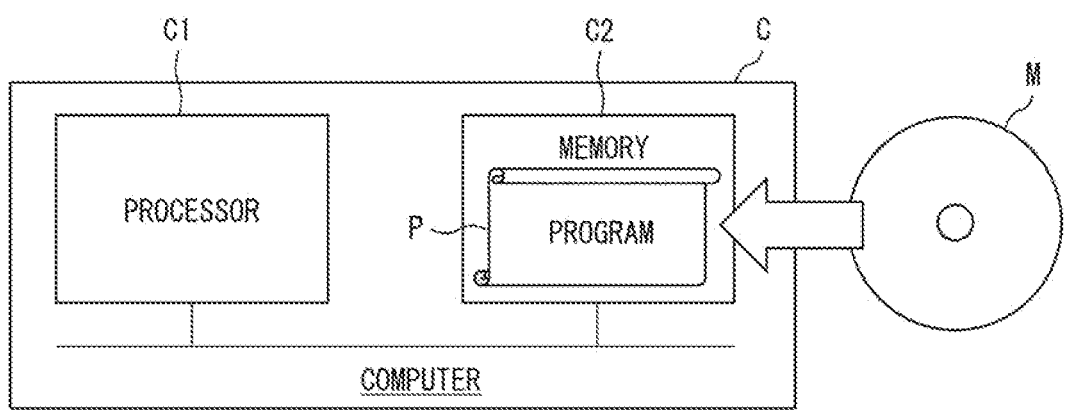
FIG. 15 is a view illustrating an example of a hardware configuration of apparatuses that constitute a coordination system according to each example embodiment.

In the latter case, each of the apparatuses constituting the coordination systems 1 and 1A is realized by, for example, a computer that executes instructions of a program that is software realizing the foregoing functions. FIG. 15 illustrates an example of such a computer (hereinafter, referred to as "computer C"). The computer C includes at least one processor C1 and at least one memory C2. The memory C2 stores a program P for causing the computer C to function as the apparatuses constituting the coordination systems 1 and 1A. In the computer C, the processor C1 reads the program P from the memory C2 and executes the program P, so that the functions of the apparatuses constituting the coordination systems 1 and 1A are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

Additional Remark 1

The present invention is not limited to the foregoing example embodiments, but may be altered in various ways by a skilled person within the scope of the claims. For example, the present invention also encompasses, in its technical scope, any example embodiment derived by appropriately combining technical means provided in the foregoing example embodiments.

Additional Remark 2

Some of or all of the foregoing example embodiments can also be described as below. Note, however, that the present invention is not limited to the following example aspects.

Supplementary Note 1

A coordination system including: an identification means for identifying a second service capable of providing user information to a provider of a first service; an inquiry means for inquiring, of a user who utilizes the first service, whether or not to consent to the provider of the first service using user information on the user in the second service at an opportunity of utilizing the first service; and a coordination means for, in a case where information indicative of a consent of the user has been obtained, coordinating the first service and the second service by associating user information on the user in the first service and the user information on the user in the second service with each other.

Supplementary Note 2

The coordination system according to Supplementary note 1, wherein the identification means identifies the second service with reference to an attribute of user information which is allowed to be provided to the provider of the first service in candidates for the second service and an attribute of user information requested by the provider of the first service.

Supplementary Note 3

The coordination system according to Supplementary note 1 or 2, wherein: the identification means generates link information in which the first service and the second service are linked to each other; and the inquiry means makes an inquiry to the user with reference to the link information.

Supplementary Note 4

The coordination system according to any one of Supplementary notes 1 to 3, further including a provision means for providing, to the provider of the first service, the user information in the second service which is associated with the user information in the first service.

Supplementary Note 5

The coordination system according to any one of Supplementary notes 1 to 4, wherein the inquiry means includes, in a first inquiry screen for performing user authentication in the first service, information indicative of an inquiry about whether or not to request coordination between the first service and the second service, and, in a case where a result of the inquiry in the first inquiry screen indicates a request for the coordination, includes, in a second inquiry screen for performing user authentication in the second service, information indicative of an inquiry about whether or not to consent to the provider of the first service using the user information on the user in the second service.

Supplementary Note 6

The coordination system according to any one of Supplementary notes 1 to 5, wherein the inquiry means makes a further inquiry about bounds of what is permitted to be used by the provider of the first service among the user information on the user in the second service.

Supplementary Note 7

A coordination method including: at least one processor identifying a second service capable of providing user information to a provider of a first service; the at least one processor inquiring, of a user who utilizes the first service, whether or not to consent to the provider of the first service using user information on the user in the second service at an opportunity of utilizing the first service; and the at least one processor, in a case where information indicative of a consent of the user has been obtained, coordinating the first service and the second service by associating user information on the user in the first service and the user information on the user in the second service with each other.

Supplementary Note 8

A program for causing a computer to function as: an identification means for identifying a second service capable of providing user information to a provider of a first service; an inquiry means for inquiring, of a user who utilizes the first service, whether or not to consent to the provider of the first service using user information on the user in the second service at an opportunity of utilizing the first service; and a coordination means for, in a case where information indicative of a consent of the user has been obtained, coordinating the first service and the second service by associating user information on the user in the first service and the user information on the user in the second service with each other.

Supplementary Note 9

A coordination system comprising at least one processor, the at least one processor carrying out: an identification process of identifying a second service capable of providing user information to a provider of a first service; an inquiry process of inquiring, of a user who utilizes the first service, whether or not to consent to the provider of the first service using user information on the user in the second service at an opportunity of utilizing the first service; and a coordination process of, in a case where information indicative of a consent of the user has been obtained, coordinating the first service and the second service by associating user information on the user in the first service and the user information on the user in the second service with each other.

Note that the coordination system may further include a memory, which may store a program for causing the at least one processor to carry out the identification process, the inquiry process, and the coordination process. Furthermore, the program may be recorded in a non-transitory, tangible computer-readable storage medium.

REFERENCE SIGNS LIST 1, 1A: coordination system
10: coordination server
20: first server
30: second server
40: user terminal
110, 210, 310, 410: control unit
120, 220, 320, 420: storage unit
130, 230, 330, 430: communication unit
11, 111, 213: identification unit
12, 112, 214: inquiry unit
13, 113: coordination unit
114: provision unit
211, 311: service provision unit
212: request unit
215: user information request unit
312: registration unit
313: user information transmission unit
440: input unit
450: output unit
C1: processor
C2: memory

The invention claimed is:

1. A coordination system comprising at least one processor, the at least one processor carrying out:
   an identification process of identifying a second service capable of providing user information to a provider of a first service;
   an inquiry process of inquiring, of a user who utilizes the first service, whether or not to consent to the provider of the first service using user information on the user in the second service at an opportunity of utilizing the first service; and
   a coordination process of, in a case where information indicative of a consent of the user has been obtained, coordinating the first service and the second service by associating user information on the user in the first service and the user information on the user in the second service with each other;
   wherein in the inquiry process,
      in a case where user authentication in the first service has succeeded, and the user requests coordination between the first service and the second service, including, on a second service inquiry screen for performing user authentication in the second service, information indicative of an inquiry about whether or not to consent to the provider of the first service using the user information on the user in the second service.

2. The coordination system according to claim 1, wherein in the identification process, the second service is identified with reference to an attribute of user information which is allowed to be provided to the provider of the first service in candidates for the second service and an attribute of user information requested by the provider of the first service.

3. The coordination system according to claim 1, wherein:
   in the identification process, link information in which the first service and the second service are linked to each other is generated; and
   in the inquiry process, an inquiry is made to the user with reference to the link information.

4. The coordination system according to claim 1, wherein the at least one processor further carries out a provision process of providing, to the provider of the first service, the user information in the second service which is associated with the user information in the first service.

5. The coordination system according to claim 1, wherein in the inquiry process,
   information indicative of an inquiry about whether or not to request coordination between the first service and the second service is included in a first service inquiry screen for performing user authentication in the first service, and
   in a case where a result of the inquiry in the first service inquiry screen indicates a request for the coordination, information indicative of an inquiry about whether or not to consent to the provider of the first service using the user information on the user in the second service is included in the second service inquiry screen.

6. The coordination system according to claim 1, wherein in the inquiry process, a further inquiry is made about bounds of what is permitted to be used by the provider of the first service among the user information on the user in the second service.

7. A coordination method comprising:
- at least one processor identifying a second service capable of providing user information to a provider of a first service;
- the at least one processor inquiring, of a user who utilizes the first service, whether or not to consent to the provider of the first service using user information on the user in the second service at an opportunity of utilizing the first service; and
- the at least one processor, in a case where information indicative of a consent of the user has been obtained, coordinating the first service and the second service by associating user information on the user in the first service and the user information on the user in the second service with each other;
- in a case where user authentication in the first service has succeeded, and the user requests coordination between the first service and the second service, the at least one processor including, on a second service inquiry screen for performing user authentication in the second service, information indicative of an inquiry about whether or not to consent to the provider of the first service using the user information on the user in the second service.

8. A non-transitory storage medium storing a program for causing a computer to carry out:
- an identification process of identifying a second service capable of providing user information to a provider of a first service;
- an inquiry process of inquiring, of a user who utilizes the first service, whether or not to consent to the provider of the first service using user information on the user in the second service at an opportunity of utilizing the first service; and
- a coordination process of, in a case where information indicative of a consent of the user has been obtained, coordinating the first service and the second service by associating user information on the user in the first service and the user information on the user in the second service with each other;

wherein the inquiry process further comprises:
- in a case where user authentication in the first service has succeeded, and the user requests coordination between the first service and the second service,
- including, on a second service inquiry screen for performing user authentication in the second service, information indicative of an inquiry about whether or not to consent to the provider of the first service using the user information on the user in the second service.

9. A coordination system comprising at least one processor, the at least one processor carrying out:
- an identification process of identifying a second service capable of providing user information to a provider of a first service;
- an inquiry process of inquiring, of a user who utilizes the first service, whether or not to consent to the provider of the first service using user information on the user in the second service at an opportunity of utilizing the first service; and
- a coordination process of, in a case where information indicative of a consent of the user has been obtained, coordinating the first service and the second service by associating user information on the user in the first service and the user information on the user in the second service with each other;

wherein in the inquiry process,
- information indicative of an inquiry about whether or not to request coordination between the first service and the second service is included in a first service inquiry screen for performing user authentication in the first service, and
- in a case where a result of the inquiry in the first service inquiry screen indicates a request for the coordination, information indicative of an inquiry about whether or not to consent to the provider of the first service using the user information on the user in the second service is included in a second service inquiry screen.

\* \* \* \* \*